Figure 1:
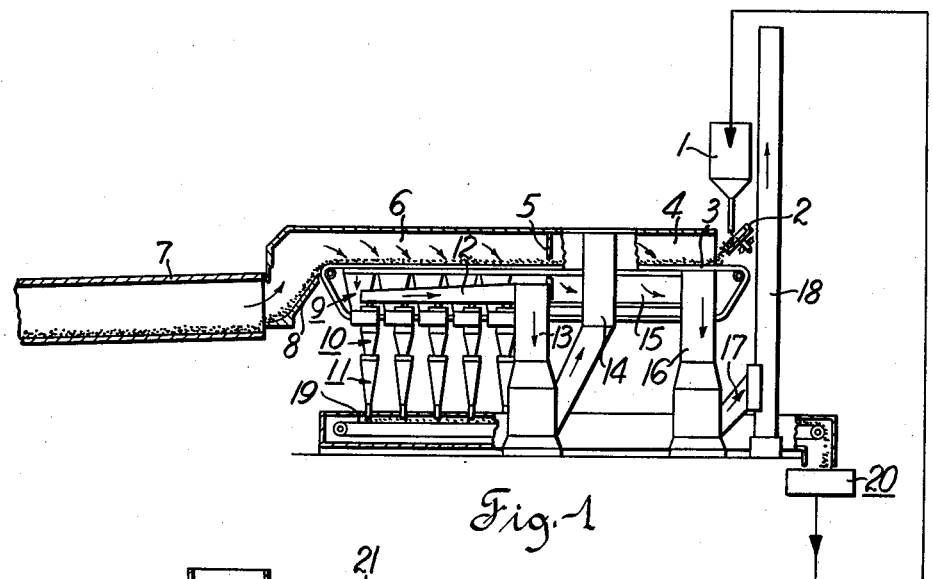

United States Patent Office 3,110,751
Patented Nov. 12, 1963

3,110,751
PROCESS FOR THE REDUCTION OF THE ALKALI CONTENT IN CEMENT CLINKER
Erich Bade, Ahlen, Westphalia, Germany, assignor to Allis-Chalmers Manufacturing Company, Milwaukee, Wis.
Filed Aug. 15, 1961, Ser. No. 131,558
4 Claims. (Cl. 263—53)

This invention relates to production of cement by burning raw material to produce cement clinker. Specifically, it is a process whereby the final cement product is low in alkali.

The presence of alkali in cement may result in certain undesirable characteristics such as a tendency to flake or to develop structural weaknesses. These tendencies have caused antipathy by potential cement purchasers toward high alkaline cement. This factor, plus the great diversity and specialization of types of cement used in modern construction applications, has created a situation where it is desirable to keep the alkali content of cement at a minimum.

Rotating kilns, for making cement, that discharge relatively high temperature gases directly to a stack (for dispersing the gases to the atmosphere) do not produce cement containing an objectionable amount of alkali. However, such plants have relatively high fuel requirements of the order of 750,000 to 1,000,000 B.t.u. per barrel of cement clinker. Much lower fuel consumption, of the order of 600,000 B.t.u. per barrel, has been achieved when a traveling grate is placed between the gas discharge end of the kiln and the stack. However, for reasons that will be discussed, this more efficient arrangement is more likely to produce cement with a higher alkali content than an arrangement without a grate. With such high efficiency equipment, cement raw material is advanced along the grate and fed into the gas discharge end of the kiln. While the raw material is on the grate it is twice exposed to the kiln exit gases that are on their way to the stack. By suitable duct work and baffle structure the kiln exit gases are caused to make two downward passes through the raw material on the grate as the material is carried toward the raw material feed inlet end of the kiln (which is the gas exit end of the kiln). The first exposure of a particular quantity of the raw material to the gases is for the purpose of drying wet agglomerates made from finely divided raw material. The dry agglomerates are then exposed to high temperature kiln exit gases for the purpose of preheating the agglomerates to give them sufficient strength to withstand final burning in the kiln with little or no degradation. In this high efficiency equipment gases discharge from the kiln at about 1800° F. On the first pass through the agglomerates on the grate, the kiln exit gases preheat previously dried agglomerates and the gases themselves are cooled to about 500° F.; and, on the second pass of the gases through the agglomerates on the grate, the gases dry previously wet formed agglomerates and the gases are further cooled to about 200° F. at which time the gases are permitted to enter the stack for discharge to the atmosphere. This latter equipment is more efficient and cleaner operating than the former for two reasons: first, so much more of the heat released by burning fuel in the kiln is transferred to the material (because of the additional exposure while making a double pass through material on the grate), and accordingly, so much less heat is wasted up the stack to atmosphere; and, secondly, the double pass of gases through the material on the grate results in filtering the gases before they are permitted to go up the stock to the atmosphere of the surrounding community. This inherent filtering action of a double pass of gases through material on the grate is supplemented by directing the gases through the cyclone dust separators after the first pass through material on the grate but before the second pass. Cyclone dust separators are well known devices that are effective to remove particles 12 to 15 microns and larger. It has been conventional practice for this material to be mixed with raw material feed and reintroduced into the system.

The high efficiency equipment that has been described has been found to produce a finished cement clinker having a higher alkali content than that produced by the lower efficiency equipment described earlier. This appears to be a direct result of the greater utilization of the available heat and the correspondingly lower temperatures of gases discharged to the stack. In this high efficiency system alkaline vapors that are generated in the kiln are not discharged up the stack as they are when equipment is used that discharges high temperature gases directly to the stack. With this high efficiency system the low temperatures reached after the gases exit from the kiln, but before they go up the stack, cause the alkaline vapors to sublimate and precipitate on the raw material on the grate and the dust hovering over the grate. The filtering action of the gases through raw material on the grate removes the alkaline substances carried as dust particles or on fine dust particles thus preventing the alkali from getting out of the system with the gases. This continual recovery of alkali produces cement clinker with an alkali content higher than is desired because the kiln reaches a supersaturated alkaline condition that retards the evaporation of alkali out of the raw material when it is given the final heating in the kiln.

The nature of the present invention resides in and stems from the inventor's teaching that a significant portion of the alkaline precipitates, in the high efficiency system described, can be found among the material caught in the cyclone dust collectors, and that the past practice of reintroducing this material to the system has led to the high alkaline problem. The inventor teaches that an improved process for making low alkaline cement clinker can therefore be carried out on the described high efficiency equipment by treating the material caught by these cyclones, as for example by leaching, to remove alkali therefrom before returning this material to this system. The nature of the present invention also and additionally resides in the inventor's teaching that within the material caught by the cyclone dust separators the alkali will be found in greater quantities in the smaller particles than in the larger and, therefore, the alkali content of this material can be reduced before any of the material is returned to the system by first sifting it to remove all particles of a chosen size and smaller. The chosen size is that size which when it and all smaller are removed will leave a residue having a commercially unobjectionable alkali content.

The objects of this invention are to produce, with a high efficiency traveling grate and rotating kiln cement making apparatus, a final cement clinker that is sufficiently low in alkali content to meet the more critical commercial requirements; to produce such cement clinker by a practicable and commercially feasible method; and, to enhance the commercial advantages of such method by the incidental production of a commercially valuable byproduct.

Other objects and advantages will be apparent from the following detailed description of a typical installation where this process could be used.

Figure 2:
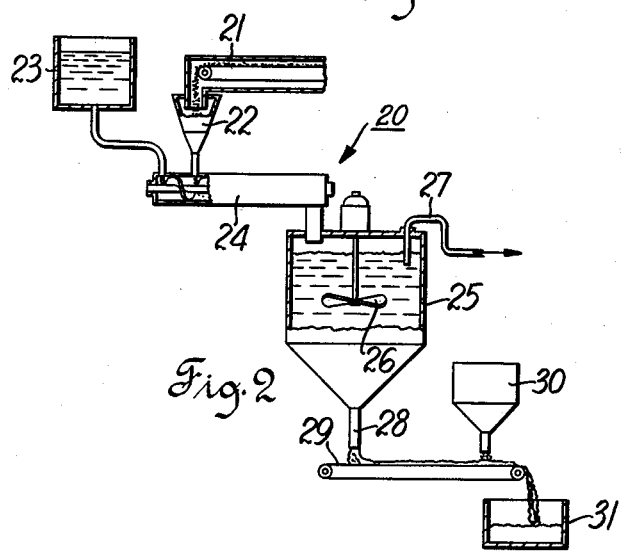

FIG. 1 is a diagrammatic illustration of a high efficiency traveling grate and revolving kiln installation with a modification that embodies this invention; and FIG. 2 is a schematic illustration of a separation process that could be used in association with the installation shown in FIG. 1.

Referring to FIG. 1, raw material to be processed is introduced into the system by transportation to a feeder bin 1 which passes the raw material to a pelletizer mechanism 2. The pellets are produced as moist nodules or agglomerates and then deposited onto a gas pervious traveling grate 3 at a uniform depth and conveyed through a drying chamber 4, through a separating wall 5, through a preburning chamber 6, and into a rotating kiln 7 by means of chute 8.

Hot gases produced by the burning of suitable fuel and raw material in the rotating kiln 7 are drawn through the preburning chamber 6 by any convenient means, such as a fan (not shown) located in the vertical conduit 13. From the preburning chamber 6 the gases pass through the raw material, traveling grate 3, funnels 9, and cyclone dust separators 10. The dust separators 10 cause dust present in the gases to be precipitated into dust collectors 11. Relatively dust free gas is then passed through a collection conduit 12, through the vertical conduit 13, through a connecting conduit 14, and through the drying chamber 4. The gases then pass from the drying chamber 4, through the raw material, through the traveling grate 3, through a suction chamber 15, and through an exhaust conduit 16 from where it is discharged into the atmosphere by passing through a connecting pipe 17 and exhaust stack 18.

The dust collected in the duct collectors 11 is deposited on a transporting device such as a conveying belt 19 and conducted to a seperating means 20, an example of which will be explained with FIG. 2, for removing alkali. According to this process the material on conveyer 19 is not returned to bin 1 until after it is first treated to remove alkali therefrom. Several suitable techniques are available for separating alkali from this dust. For example, separating means 20 may be any leaching, flotation, or combination leaching-flotation process or device. Furthermore, since the alkali is found associated with the smaller particles of the dust in greater amounts than with the larger particles, the amount of alkali present in the material returned to bin 1 can be reduced to commercially acceptable amounts by sifting this material to remove the smaller particles. The removed high alkaline particles can be diverted to noncement uses such as use as a fertilizer.

With regard to separating means 20 operating on a basis of size, by way of a hypothetical example, if the smallest particles are removed to the extent of ten percent of the total amount of dust sifted, more than ten percent of the alkali will be removed. This is the result of more of the alkali being with small particles than large. Doubling the amount of the smallest particles removed (from ten to twenty percent of the total) will, for the reason stated, remove more than double the amount of alkali. Thus, one or more size separations can be chosen and made such that the remaining larger particles, as residue, will contain less alkali until a residue is finally achieved that contains alkali within commercially acceptable limits.

FIG. 2 shows an example of separating means 20 using a leaching technique. For example, the dust may be treated to remove alkali by transporting the dust from belt 19 to the leaching system along a conveyer belt 21 that passes it into a feeder cone 22. The dust is then mixed with water from a tank 23 by means of a mixing pump 24. The resulting mixture is conveyed to a leaching tank 25 where it is agitated by an impeller 26 which accelerates the passing into solution of the alkali.

The solution, containing alkali which has been separated from the dust particles, is drawn off through a discharge pipe 27 for disposal, further processing, or storage for future commercial use.

The particles remaining at the bottom of the leaching tank 25 are drawn off and passed through a discharge tube 28 onto a conveyer belt 29 upon which they are drained and transported to a point where they are mixed with dry raw material feed from a storage bin 30 to provide a total mix having a total moisture content low enough to be returned to the system of FIG. 1. The mixture on the conveyer 29 of FIG. 2 may be carried to and deposited in a storage tank 31 as shown in FIG. 2, or transported by some means to the feeder bin 1, as shown in FIG. 1.

With a nominal added investment, apparatus such as indicated in FIG. 2 can be adapted to also be operative to remove alkali with flotation techniques by merely inserting flotation cells in the circuit.

By processing the dust collected in the dust collectors 11, in one of the ways referred to in order to remove alkali, the advantage of reutilization of at least a substantial portion of the dust collected is retained without the disadvantage of increasing the alkali content of the cement. The location of the cyclone separators before the drying chamber causes a high percentage of alkaline substances present to be collected. This process not only retains the advantages of high thermal efficiency and clean operation without any ensuing disadvantages, but also enables a high alkaline substance to be separated and sold for noncement uses. Thus, there is an increase in the quality of the cement product coupled with production of a commercially valuable byproduct.

What is claimed is:

1. A method for reducing the alkali content of cement clinker and producing as a byproduct alkaline dust that may be used as a fertilizer, comprising the steps of:

first, feeding cement raw material through drying, preburning, and final burning zones successively;

second, directing a flow of hot dust laden gases from the final burning zone at a temperature of about 1800° F. through an amount of the material in the preburning zone sufficient to lower the temperature of the gases to about 500° F.;

third, directing the gases after they have passed through the preburning zone and have cooled to about 500° F. but before they have entered the drying zone, in a stream moving along a cyclonic path;

fourth, conducting the flow of the approximately 500° F. gases from the preburning zone through the material in the drying zone;

fifth, collecting those dust particles that are thrown radially outwardly from said stream by said cyclonic movement;

sixth, treating the collected dust to provide at least a portion thereof having lower alkali content than the dust as collected; and seventh, adding the portion of dust having the lowered alkali content to material for feeding through the drying zone in the aforesaid manner.

2. A method according to claim 1 in which the raw material is first formed into moist nodules before being fed through the drying zone.

3. A method according to claim 2 in which the nodules are conveyed through the drying and preburning zones as a body with individual nodules at rest within the body, and thereafter the body of nodules is disrupted and the nodules are tumbled through the final burning zone.

4. A method for reducing the alkali content of cement clinker and producing as a byproduct alkaline dust that may be used as a fertilizer, comprising the steps of:

first, feeding cement raw material through drying, preburning, and final burning zones successively;

second, directing a flow of hot dust laden gases from the final burning zone at a temperature of about 1800° F. through an amount of material in the preburning zone sufficient to lower the temperature of the gases to about 500° F.;

third, directing the gases after they have passed through the preburning zone and have cooled to about 500° F. but before they have entered the drying zone, in a stream moving along a cyclonic path;

fourth, conducting the flow of the approximately 500° F. gases from the preburning zone through the material in the drying zone;

fifth, collecting those dust particles that are thrown radially outwardly from said stream by said cyclonic movement;

sixth, separating the collected dust into portions of unequal alkali content;

seventh, adding the portion of dust having the lower alkali content to material for feeding through the drying zone in the aforesaid manner; and eighth, excluding the portion of dust having the higher alkali content from further cement making operations and diverting this portion to byproduct ends.

References Cited in the file of this patent

UNITED STATES PATENTS

| | | |
|---|---|---|
| 2,314,296 | Wanner | Mar. 16, 1943 |
| 2,477,262 | Mooser | July 26, 1949 |

FOREIGN PATENTS

| | | |
|---|---|---|
| 213,765 | Austria | July 15, 1960 |